US012704899B2

(12) United States Patent
Varekamp et al.

(10) Patent No.: US 12,704,899 B2
(45) Date of Patent: Aug. 11, 2026

(54) CONTROLLING VR/AR HEADSETS

(71) Applicant: KONINKLIJKE PHILIPS N.V., Eindhoven (NL)

(72) Inventors: Christiaan Varekamp, Veldhoven (NL); Arnoldus Werner Johannes Oomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 19/119,507

(22) PCT Filed: Oct. 11, 2023

(86) PCT No.: PCT/EP2023/078110
§ 371 (c)(1),
(2) Date: Apr. 9, 2025

(87) PCT Pub. No.: WO2024/083582
PCT Pub. Date: Apr. 25, 2024

(65) Prior Publication Data

US 2026/0153920 A1 Jun. 4, 2026

(30) Foreign Application Priority Data

Oct. 19, 2022 (EP) .................................... 22202450

(51) Int. Cl.

| | |
|---|---|
| ***G06F 3/01*** | (2006.01) |
| ***G02B 27/01*** | (2006.01) |
| ***G06T 11/00*** | (2026.01) |
| ***G06V 20/20*** | (2022.01) |

(52) U.S. Cl.
CPC ............ *G06F 3/011* (2013.01); *G02B 27/017* (2013.01); *G06T 11/00* (2013.01); *G06V 20/20* (2022.01)

(58) Field of Classification Search
CPC ....... G06F 3/011; G02B 27/017; G06T 11/00; G06V 20/20
See application file for complete search history.

(56) References Cited

U.S. PATENT DOCUMENTS

| | | | | |
|---|---|---|---|---|
| 2012/0050140 | A1 | 3/2012 | Border et al. | |
| 2016/0196694 | A1 | 7/2016 | Lindeman | |
| 2017/0343811 | A1* | 11/2017 | Mese | G02B 27/0172 |
| 2018/0123813 | A1 | 5/2018 | Milevski et al. | |
| 2018/0147483 | A1* | 5/2018 | Osman | A63F 13/5258 |
| 2018/0157321 | A1 | 6/2018 | Liu | |
| 2019/0360177 | A1* | 11/2019 | Kiyota | B60R 1/23 |

(Continued)

OTHER PUBLICATIONS

International Search Report and Written Opinion from PCT/EP2023/078110 dated Dec. 7, 2023.

*Primary Examiner* — Cory A Almeida

(57) ABSTRACT

A system comprising a virtual reality, VR, and/or augmented reality, AR, capable headset and a sensor arrangement for imaging the real environment and determining a facing direction in which a user is facing. The headset is configured to display a virtual scene and provide corresponding virtual audio to the user in a virtual mode. The headset is also configured to show the real environment and provide corresponding real audio to the user in a local mode. In response to a real person being detected and in dependence on their position and the facing direction, the headset switches from the virtual mode to the local mode.

15 Claims, 4 Drawing Sheets

(56) References Cited

U.S. PATENT DOCUMENTS

| | | | |
|---|---|---|---|
| 2021/0192802 | A1 | 6/2021 | Nepveu et al. |
| 2021/0289297 | A1 | 9/2021 | Souviraa-Labastie et al. |
| 2021/0378768 | A1 | 12/2021 | Olson et al. |
| 2022/0066207 | A1* | 3/2022 | Croxford ............... G06V 40/20 |
| 2022/0137916 | A1 | 5/2022 | Varekamp et al. |
| 2022/0214743 | A1 | 7/2022 | Dascola et al. |
| 2023/0398435 | A1* | 12/2023 | Dorn ........................ A63F 13/26 |

* cited by examiner

CONTROLLING VR/AR HEADSETS

CROSS-REFERENCE TO PRIOR APPLICATIONS

This application is the U.S. National Phase application under 35 U.S.C. § 371 of International Application No. PCT/EP2023/078110, filed on Oct. 11, 2023, which claims the benefit of EP Patent Application No. EP 22202450.7, filed on Oct. 19, 2022. These applications are hereby incorporated by reference herein.

FIELD OF THE INVENTION

The invention relates to the field of virtual/augmented/mixed reality capable headsets. In particular, the invention relates to a user interacting with the real environment whilst wearing one of said headsets.

BACKGROUND OF THE INVENTION

Current headsets can be classified into one of three types: virtual reality (VR) only headsets where the user needs to take the headset off to view the world outside, pass-through headsets with integrated cameras which allow access to the outside visual world and see-through headset which are, for example, semi-transparent and always allow light from the outside through to the user's eyes.

An illustration of a pass-through headset is shown in FIG. 1. The headset 100 has a housing 102 with two displays (not shown) and a strap 106 to hold the headset 100 on the head of a user. The headset also has sensors 104 where at least one of the sensors is a camera to image the environment around the user.

These types of pass-through headsets have a pass-through mode which is currently used to stop a user from colliding with objects in a room. For instance, as soon as a user comes too close to the walls of a room, a pass-through mode is automatically switched on.

Additionally, both pass-through and see-through headsets allow mixing of images that are locally captured or locally visible (i.e. directly outside the headset) with images as captured at a remote location (i.e. a virtual scene).

The need to mix local and remote data can be present in telecommunication settings when there are multiple people present on one or both sides. The challenge then is to make a natural communication experience possible without a complex hardware setup on either one end. In particular, there is a need to improve the interaction of the user wearing a VR/AR capable headset with real people without the need for a complex hardware setup or the need for physically removing the headset.

US 2022/214743 A1 discloses increasing the transparency of virtual content in a VR/AR headset when the user leans or turns towards a second user.

SUMMARY OF THE INVENTION

The invention is defined by the claims.

According to examples in accordance with an aspect of the invention, there is provided a system comprising a virtual reality, VR, and/or augmented reality, AR, capable headset and a sensor arrangement for imaging a real environment and determining a facing direction in which a user is facing, wherein the headset is configured to:

display a virtual scene and provide corresponding virtual audio to the user in a virtual mode;

show the real environment and provide corresponding real audio to the user in a local mode; and switch from the virtual mode to the local mode in response to a real person being detected and in dependence on the position of the real person and on the facing direction in which the user is facing.

The virtual scene is a remote scene. It may be a real world scene captured with real cameras but at a location remote from the user (hence virtual from the viewpoint of the user) or it may be a not real world scene/avatar created in software. The term "virtual scene" should be understood accordingly. When a user is wearing VR/AR headset, their visual and auditory senses are often not fully aware of the real environment around them. As such, it is proposed to show the real environment, in a local mode, when a real person is detected (in the real environment). The real environment can be shown when the real person is detected as being within or close to the visual field of view of the user, i.e. when the user is facing the real person. This allows the user to interact with the real person despite wearing the AR/VR headset. The facing direction corresponds to the orientation of the user's head, i.e. the direction in which they are looking (the normal direction relative to a facial plane).

In a first example, the headset is capable of augmented reality (AR). In this case, the lenses of the AR headset can be configured to display the virtual scene in the virtual mode and then turn transparent in the local mode to allow the user to see the real environment (e.g. as if they were wearing normal glasses).

In a second example, the headset is capable of virtual reality (VR). In this case, the screen of the VR headset can be configured to display the virtual scene in the virtual mode and, in the local mode, display the real environment, as imaged by the sensor arrangement, to the user.

The virtual scene for example includes another user with their own headset but who is located at a different spatial location to the user. Thus, the user can engage with a remote other user of the system using virtual reality, and can engage with a local real person in the local mode. The engagement depends on the direction in which the user is facing (i.e. towards the remote other user in the virtual space or towards the local real person in the real space).

The headset for example allows 3D, 360 degree, functionality, whereby the user can look around a real users can be different spatial locations including elevations.

The headset may be configured to switch from the virtual mode to the local mode in dependence on the angle between a first direction in which the real person is detected and the facing direction of the user. For example, when the angle between the facing direction of the user and the direction of the real person, from the user, is below a first threshold, the headset switches from the conventional virtual mode to a local mode which shows the real environment.

The headset may be further configured to display a portion of the virtual scene and a portion of the real environment to the user in a transition mode, wherein switching from the virtual mode to the local mode comprises switching from the virtual mode to the transition mode in response to the angle between the first direction and the facing direction of the user being between a first threshold angle and a second, larger, threshold angle and switching from the transition mode to the local mode in response to the angle between the first direction and the facing direction of the user being smaller than the first threshold angle.

The transition mode enables the user to see a portion of both the virtual scene and the real environment during the transition from the virtual mode to the local mode. For example, this could signal to the user that a real person is nearby whilst still being able to see a portion of the virtual scene.

At the same time, the transition mode does not require a large amount of computational resources as the images displayed by the headset during the transition mode are merely split between the virtual scene and the real environment. In other words, the virtual world and the real environment are placed side-by-side in the transition mode.

Of course, the boundary between the virtual scene and the real environment can be blurred.

A ratio between the portion of the virtual scene displayed to the user and the portion of the real environment displayed to the user, in the transition mode, may be dependent on the angle between the first direction and the facing direction of the user.

For example, the ratio of the virtual portion to the real portion, in the transition mode, may change as the user is turning towards to the real person such that more of the real environment is shown as the user gets closer to the real person (i.e. the angle between the first direction and the facing direction of the user gets smaller).

The headset may be further configured to identify a common reference object appearing in both the virtual scene and the real environment at a reference direction from the user, stitch the virtual scene and the real environment, as captured by the sensor arrangement, around the common reference object to generate a transition image and display the transition image in the transition mode.

This provides a more natural transition between the virtual mode and the local mode. Additionally, the presence of the common reference object in the virtual scene may provide information of the real environment to the user whilst in the virtual mode.

The virtual scene may comprise a virtual object at a second direction relative to the user and the first threshold angle may be dependent on the angle between the second direction and the facing direction of the user.

For example, the user may be in a conference call with a virtual object in the form of a virtual person, which appears in the virtual scene, and a real person. Thus, the user can interact with both the virtual person and the real person depending on the facing direction of the user.

For example, the first threshold angle may equal to the angle between the second direction of the virtual object and the facing direction of the user. As such, when the facing direction of the user is closer to the real person than the virtual object, the headset switches from virtual mode to local mode.

The headset may be configured to switch from the virtual mode to the local mode only if the angle between the second direction and the facing direction of the user is larger than a third threshold angle.

This provides a display priority for the virtual mode when the real person and the virtual object (e.g. a virtual person in a conference call) are both relatively close. For example, the third threshold angle may be equal to, or similar, to the angular size of the virtual object.

The headset may be further configured to determine the color characteristics of the real environment as imaged by the sensor arrangement and adapt the virtual scene based on the color characteristics of the real environment.

This enables the headset to adapt the color characteristics of the virtual scene to match the light characteristics of the real environment. Thus, the switch between the virtual mode and the local mode will feel more natural to the user.

A similar approach may be used with audio. The headset may be further configured to determine the audio characteristics of the real environment and adapt the virtual audio based on the audio characteristics of the real environment.

Of course, with VR headsets, it is possible to adapt the color characteristics of the real environment, as displayed on the VR headset, based on the color characteristics of the virtual scene.

The invention also provides a method for controlling a virtual reality, VR, and/or augmented reality, AR, capable headset by using a sensor arrangement for imaging a real environment and determining a facing direction in which a user is facing, the method comprising:

- displaying a virtual scene on the headset and providing corresponding virtual audio to the user in a virtual mode;
- showing the real environment and providing corresponding real audio to the user in a local mode; and
- switching from the virtual mode to the local mode in response to a real person being detected and in dependence on the position of the real person and on the facing direction in which the user is facing.

Switching from the virtual mode to the local mode may be in dependence on the angle between a first direction in which the real person is detected and the facing direction of the user.

The method may further comprise displaying a portion of the virtual scene and a portion of the real environment to the user in a transition mode. Switching from the virtual mode to the local mode may comprise switching from the virtual mode to the transition mode in response to the angle between the first direction and the facing direction of the user being between the first threshold angle and a second, larger, threshold angle and switching from the transition mode to the local mode in response to the angle between the first direction and the facing direction of the user being smaller than a first threshold angle.

A ratio between the portion of the virtual scene displayed to the user and the portion of the real environment displayed to the user, in the transition mode, may be dependent on the angle between the first direction and the facing direction of the user.

The method may further comprise identifying a common reference object appearing in both the virtual scene and the real environment at a reference direction from the user, stitching the virtual scene and the real environment, as captured by the sensor arrangement, around the common reference object to generate a transition image and displaying the transition image in the transition mode.

The virtual scene may comprise a virtual object at a second direction relative to the user. The method may comprise switching from the virtual mode to the local mode only if the angle between the second direction and the facing direction of the user is larger than a third threshold angle.

The invention also provides a computer program carrier comprising computer program code which, when executed on a processing system, causes the processing system to perform all of the steps of the afore-mentioned method.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
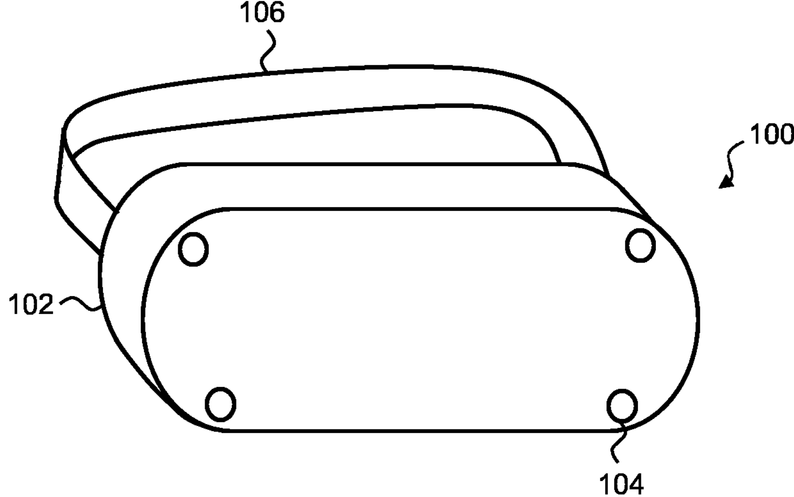
FIG. 1 shows an example of a pass-through headset.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system comprising a virtual reality, VR, and/or augmented reality, AR, capable headset and a sensor arrangement for imaging the real environment and determining a facing direction in which a user is facing. The headset is configured to display a virtual scene and provide corresponding virtual audio to the user in a virtual mode. The headset is also configured to show the real environment and provide corresponding real audio to the user in a local mode. In response to a real person being detected and in dependence on their position and the facing direction, the headset switches from the virtual mode to the local mode.

Natural communication between a user wearing a headset and a real person in the same room is not a trivial matter. This issue is illustrated in FIGS. 2 and 3.

Figure 2:
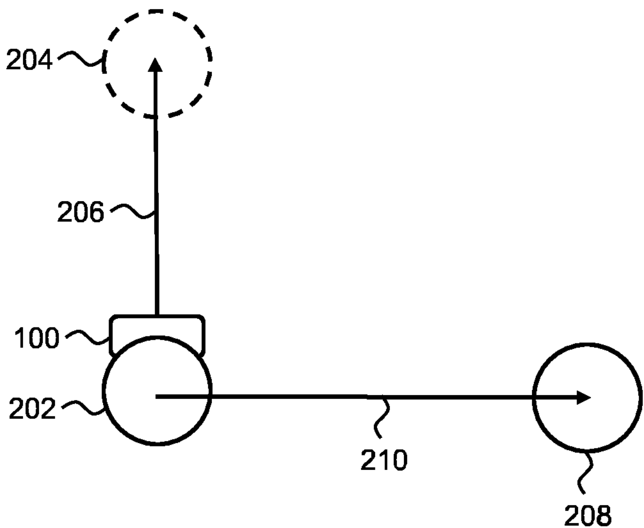
FIG. 2 illustrates a user interacting with a virtual person and a real person.
Figure 3:
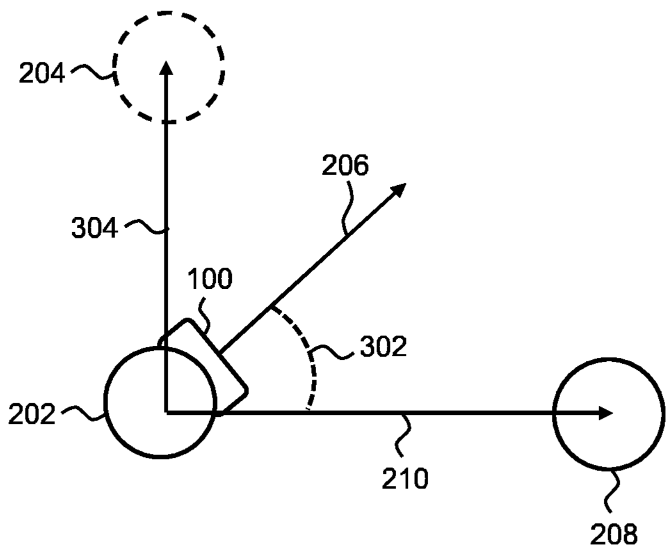
FIG. 3 shows the user of FIG. 2 after turning towards the real person.

FIG. 2 illustrates a user 202 interacting with a virtual person 204 and a real person 208. User 202 is wearing a VR headset 100 to virtually communicate with the virtual person 204. In this case, the user 202 is physically located at a different place as the virtual person 204 (e.g. during a virtual conference). Thus, the headset 100 allows the user 202 to communicate with the virtual person 204 as if the virtual person 204 were located in the same room as the user 202. As long as the user 202 is facing in a certain direction, he will see and hear the virtual person 204 in a virtual scene displayed on the headset 100. When using a headset 100, the captured video of the virtual person 204 may be presented as stereoscopic video to the user 202, possibly even allowing head motion parallax. This last option depends on the camera capture system that captures the virtual person 204.

Similarly, head motions of the user 202 may also be used to render a correct, more immersive, sound for the speech originating from the virtual person 204. For example, this may be achieved by using the head orientation of the user (e.g. measured by the headset 100) to select the Head Related Transfer Function for binaural rendering.

However, due to the headset 100, the user 202 is completely locked inside the virtual world. Their visual and auditory senses are not aware of the real world around them. User 202 would have to take the headset 100 off to go back to the real world. In particular, when user 202 would like to communicate with a real person 208 who is in the same physical room as the user 202, taking the headset 100 off is not a particularly practical solution.

Thus, it is proposed to fill the viewport for the VR headset 100 of user 202 with a mix of content from the virtual scene and from the real environment, where this mix depends on the geometrical configuration of user 202 with respect to the real person 208. Additionally, the mix may depend on the geometrical configuration of the user 202 with respect to the virtual person 204 (or any virtual object in the virtual scene). Consequently, the user 202 can more easily communicate with the real person 208 and the remote, virtual, person 204 while wearing a headset.

In particular, the geometrical configuration is based on the orientation of the user 202 (i.e. the direction in which the user is facing). For example, the headset 100 could automatically switch to a local mode (showing the real environment/world and provide corresponding local audio around the user 202) on the headset 100 if the user's viewing/facing direction is more towards the real person 208 than towards the virtual person 204. In particular, the headset 100 can switch between a virtual mode (showing the virtual scene and provide corresponding virtual audio) and a local mode based on the angle between the facing direction 206 and the direction 210 of the real person 208 relative to the user (i.e. the so-called first direction 210). For example, in FIG. 2, the user 202 is facing the virtual person 204 and the angle is around 90 degrees.

FIG. 3 shows the user 202 of FIG. 2 after turning towards the real person 208. Thus, the angle 302 between the facing direction 206 and the first direction 210 of the real person 208 relative to the user 202 is smaller than that in FIG. 2. For example, the headset 100 could switch to the local mode when the angle 302 is smaller than an angle between the facing direction 206 and a second direction 304 of the virtual person 204 relative to the user 202. The headset 100 could also switch to the local mode when the angle 302 is smaller than a pre-determined threshold (e.g. 45 degrees). In general, the switch to the local mode occurs at a first angle threshold.

Other conditions could also be added for the headset to switch to the local mode. For example, a condition could be that the real person 208 is facing the user 202 (or looking in a direction close to the user).

In the local mode, audio from the real world is provided to the user 202 (e.g. from microphones on the headset 100). Meanwhile, in the remote/virtual mode, audio from the virtual scene is provided to the user 202 (e.g. speech from the virtual person 204). The local audio and the virtual audio may be provided to the user via headphones or transducers mounted to the headset 100 worn by the user 202.

FIGS. 2 and 3 have been illustrated in two dimensions (2D). However, it will be appreciated that the concepts discussed herein also apply in the case of three dimensions (3D). In these cases, two angles may be considered. For example, a vertical angle may be considered (e.g. when the real person is elevated relative to the user) as well as a horizontal angle (e.g. angle 302). In the 3D case, the facing direction 206, the first direction 210 and the second direction 304 are also provided in 3D.

Figure 4:
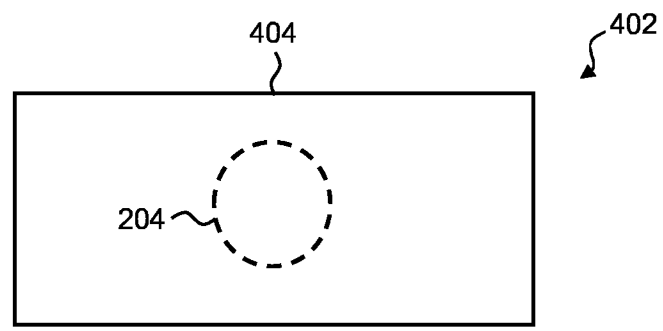
FIG. 4 illustrates images displayed on the headset to the user of FIGS. 2 and 3.
Figure 4:
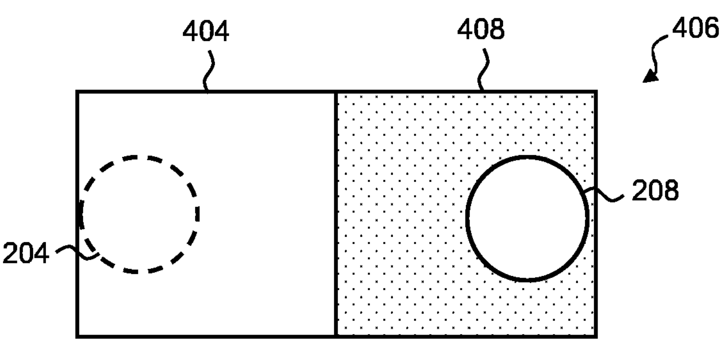
Figure 4:
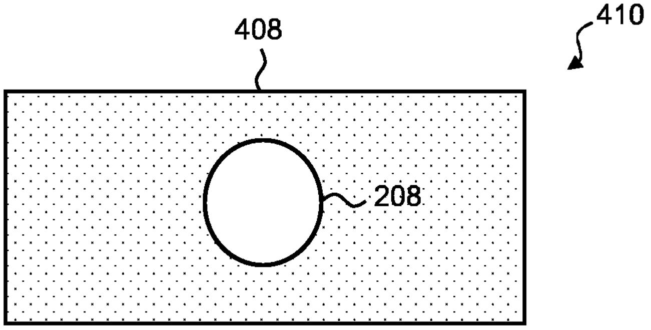

FIG. 4 illustrates images 402, 406 and 410 displayed on the headset 100 to the user 202 of FIGS. 2 and 3. Image 402 shows the virtual scene 404, image 406 shows an image split between the virtual scene 404 and an image of the real world 408, and image 410 shows the real world 408. In other words, image 402 is an example of the images displayed on the headset in the virtual mode and image 410 is an example of the images shown on the headset in the local mode.

A transition mode may also be provided, comprising a mode which is used by the headset to smoothen the transition between the virtual mode and local mode, and alert the user 202 of FIGS. 2 and 3 that a real person 208 is nearby without completely removing the user 202 from the virtual scene 404. Image 406 is an example of the images displayed on the headset in the transition mode. In the transition mode, the image 406 displayed by the headset is split between a portion of the virtual scene 204 and a portion of the real world 208. This does not require significant computational resources.

The headset may switch first from the virtual mode to the transition mode when the angle between the facing direction and the first direction is between the first threshold angle and a second, larger, threshold angle. For example, the headset may switch to the transition mode between 90 degrees and 45 degrees and then switch to the local mode when the angle is smaller than 45 degrees. Of course, the particular angles for the first and second threshold angles may depend on the particular use case and could vary depending on the direction of the virtual person relative to the user.

Virtual reality headsets can have a large field of view of e.g., 120 degrees. A small head-rotation of the user 202 in FIGS. 2 and 3 away from the virtual person 204 towards the real person 208 should therefore already make the real person 208 visible. To achieve this, local and remote visual data may be combined in the single viewport image for the user 202 (i.e. image 406) as the user 202 turns away from the virtual person 204 and towards the real person 208. The viewport on the headset can be increasingly filled with data captured by, for example, the cameras mounted on the headset as the user 202 turns towards the real person 208.

In image 406, the virtual scene 404 and the real world 408 are horizontally split (i.e. there is a vertical transition between the regions which are at different horizontal positions) in the viewport which results in an abrupt transition. To give the user the impression that the virtual person 204 and the real person 208 are actually present in a single space, the hard transition can be blurred or otherwise blended when using a VR headset. An algorithm could achieve this by creating a viewport picture by horizontally positioning the virtual scene and images of the real world with a vertical transition that depends on the user's viewing direction and low-pass filtering or blending the viewport image in a band of fixed width around the vertical transition.

The second filtering step effectively creates a gradual color change from the virtual scene to the real world (e.g. via local camera images from the headset). Since both the remote video capture comprising the virtual scene and the local headset cameras can produce stereo video, the blending can be done separately for the left-eye and right-eye images.

The blending can also be performed in 3D space using depth information. Both the remote and local capture systems may be able to capture or calculate one or more depth maps for the virtual scene and/or the real world. Using these depth maps, the stitch between the local and remote image data can be based on images and depth maps. For instance, if both the remote scene and the local scene contain a table at which people are sitting, this table may be selected as a common 3D reference plane and the seam for the stich can be located such that it falls at least on the table.

Figure 5:
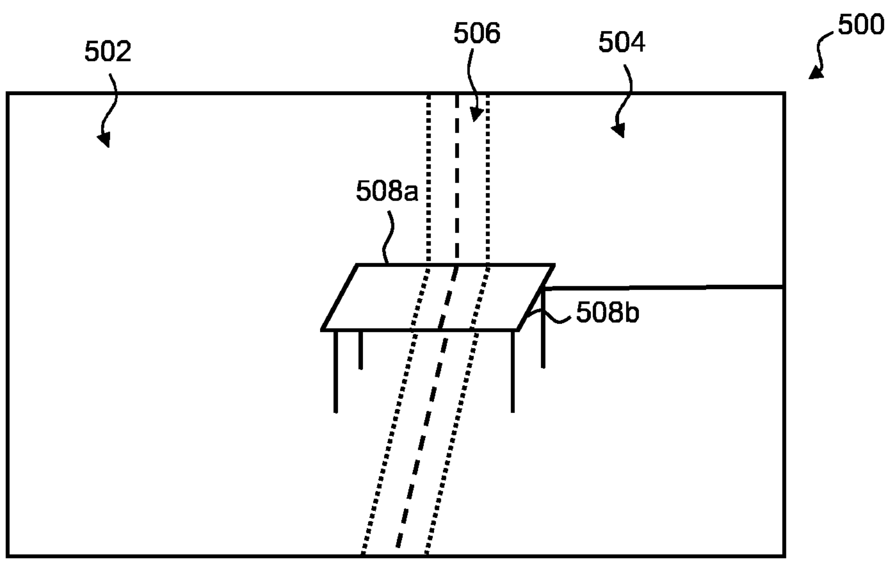
FIG. 5 shows a transition image with a table as a common reference object in the transition mode.

FIG. 5 shows a transition image 500 with a table as a common reference object in the transition mode. The remote table 508*a* gradually blends into the local table 508*b* during the transition mode. In this case, both local and remote images are stereoscopic. Thus, the seam/transition 506 can also be stereoscopic. Stereoscopic correctness can be enforced using the depth maps. This provides a smooth transition between the remote images 502 showing the virtual scene and the local images 504 showing the real world.

Known techniques for stereoscopically correct stitching, often referred to as 3D stitching, are typically used to produce 180-degree or 360-degree video using multiple input cameras. In this example, the stich covers a conference table. Such a table is likely to be visible both remotely (i.e. remote table 508*a*) and locally (i.e. local table 508*b*) and likely to have a similar geometry and color. Both geometry and color are blended in this case. The geometry is then used to re-render left-eye and right-eye images for the stitch region.

If the remote images 502 and the local images 504 do not match spatially and/or in scale, a depth transition (blending) can be first calculated in the 'stitch' region to transition between the different scales and heights of the table. Based on the blended depth map, a new stereoscopic image can be calculated for the blend region.

Figure 6:
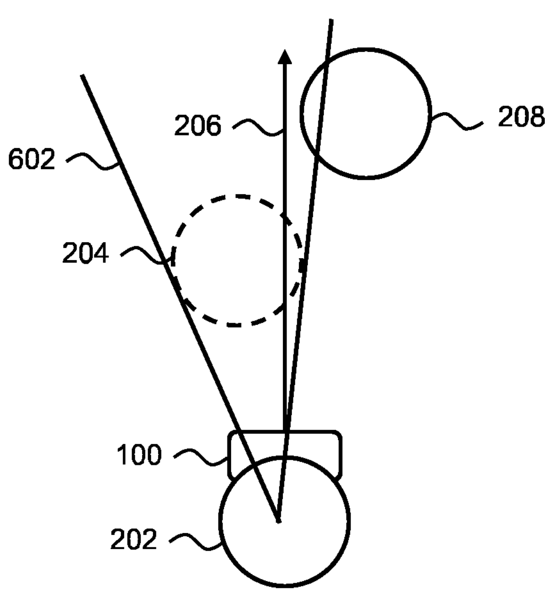
FIG. 6 illustrates a user interacting with a virtual person and a real person, where the virtual person and the real person overlap.

FIG. 6 illustrates a user 202 interacting with a virtual person 204 and a real person 208, where the virtual person 204 and the real person 208 overlap. The virtual person 204 and the real person 208 may not be allowed to cover the same area of the viewport and should thus be separated in user's 202 horizontal field of view. For example, useful values for angular separation may be 90, 60 or 45 degrees.

However, in cases such as shown in FIG. 6, one of the virtual person 204 or the real person 208 may be given priority. For example, a third threshold angle may be defined such that the local mode is not used if the angle between the facing direction 206 of the user and the second direction is smaller than the third threshold angle.

In FIG. 6, a field of view (FOV) 602 corresponding to the virtual person 204 is shown. The third threshold angle may be defined as half of the FOV 602 such that, when the user 202 is not looking directly at the virtual person 204, the switch to the local mode is allowed to happen. Of course, the third threshold angle may be larger, or smaller, than half of the FOV 602.

Light conditions of the virtual scene and local scene may differ substantially, making the transition between remote and local images more noticeable. A global color space transform may be applied to the incoming remote video using color statistics of the locally captured images. Similarly, the color space transform could be applied to the locally captured images using the color statistics of the incoming remote video.

During the transition mode, a "hear-through" mode can be activated, or enhanced, so that, as soon as the user turns to face the real person, audio cues from the real world are mixed in with an increasing intensity. This means that, as the user's head rotates from (approximately) facing the virtual person towards facing the real person 208, the real world audio signal's relative intensity is increased in a combined sound signal. In order to enable full control of the local and remote sounds, the user is preferably wearing closed headphones with one or more external microphones mounted on the headset or headphones. Binaural audio may be used to render the sound of the remote users. Note that for binaural rendering of real people, at least two microphones are required, preferably mounted at the outside of the headset close to the left and right ears of the user. When the user is substantially facing a virtual person, depending on the user's head orientation relative to the virtual person, the appropriate Head Related Transfer Functions (HRTFs) for the left and right ear, corresponding to the measured angle (between the facing direction and the first direction), is selected.

There are various ways of determining the facing direction. For example, this can be achieved by using a head tracker or using the cameras on the headset.

Additionally, the location of the virtual person may be taken into account. For example, when the virtual person moves to the left and the user is not moving, the angle may be modified resulting in a binaural experience that corresponds to the same effect as in the real world.

Similarly to the video experience, hard audio transitions may be blurred by applying cross fading between the audio signal from the remote and local locations. Preferably the cross fading is such that, in the case the user is facing the virtual person, there is some audio leakage from the real person so that they are able to get the attention of the user. Visa versa, in the case the user is facing the real person, there is preferably some audio leakage from the virtual person.

It is also desirable to apply gain control to either or both the remote and local audio to provide for a seamless transition of the audio signal level.

The room acoustics at the location of the virtual person may be substantially different from that of the user and real person. Depending on the use case, it may be desirable to either adopt the acoustics (e.g. reverberation component) of the local or remote environment in the rendering of both the virtual and real person or allow for a seamless switch between the different room acoustics.

For example, in the case the user is immersed in a gaming scenario and interacting with the virtual person who is part of that gaming scenario, it may be desirable to maintain the acoustics of the remote environment when the user turns towards the real person. In this case, the user can easily switch back to the remote environment without substantially losing the experience of immersion.

In the case of a conference call with local and remote participants, it may be desirable to adopt the room acoustics of the local environment in rendering both the local and remote users.

In scenarios where the both the local and remote acoustics are relevant, for example, when artistic expressions are involved (e.g. musical performances), it may be desirable to provide for a seamless switch between the two environments.

The switch between the remote and local mode can also be applied in the case of multiple remote and/or local users. For real people, the visual and audio cues could match those of the real world. However, for virtual/remote people, their location (and relative locations) can be chosen appropriately to fit a realistic or desirable layout. For example, a virtual person should not coincide with a real person. It may also not be desirable to interleave virtual people from one location with a real person and vice versa.

In some cases, it may not be desirable to interleave people that form a set (locally or remotely) as the people in that set may talk to each other. Scaling of the video/attenuation of the audio signal can be used to create distance in order to accommodate more people. Audio can also be rendered using specific HRTF distance parameters, which is somewhat more realistic than straightforward attenuation of the signal.

The above examples have been described based on the presence of a virtual person. However, it is possible to switch to the local mode without having to identify the direction of the virtual person relative to the user as the switch to the local mode (or switch to the transition mode) can be made dependent only on the angle between the facing direction of the user and the first direction (between the user and the real person).

Of course, it will be appreciated that any virtual object (including a virtual person) could be used in the methods described herein.

The skilled person would be readily capable of developing a processor for carrying out any herein described method. Thus, each step of a flow chart may represent a different action performed by a processor and may be performed by a respective module of the processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

A computer program carrier may comprise a relatively permanent storage device (e.g. hard drives, solid state drives etc.) and/or may comprise a temporary carrier (e.g. a bit-stream etc.).

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

Functions implemented by a processor may be implemented by a single processor or by multiple separate processing units which may together be considered to constitute a "processor". Such processing units may in some cases be remote from each other and communicate with each other in a wired or wireless manner.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. An apparatus comprising:

a headset, wherein the headset is a virtual reality and/or augmented reality capable headset; and a sensor arrangement, wherein the sensor arrangement is arranged to image a real environment, wherein the sensor arrangement is arranged to determine a facing direction, wherein the facing direction is the direction in which a user is facing, wherein the headset is arranged to display a virtual scene, wherein the headset is arranged to provide corresponding virtual audio to the user in a virtual mode, wherein the headset is arranged to show the real environment, wherein the headset is arranged to provide corresponding real audio to the user in a local mode;

wherein the headset is arranged to display a portion of the virtual scene and a portion of the real environment to the user in a transition mode, wherein the headset is arranged to switch from the virtual mode to the local mode in response to a detection of a real person and based on the position of the real person, the facing direction, the angle between a first direction in which the real person is detected and the facing direction, wherein switching from the virtual mode to the local mode comprises:

switching from the virtual mode to the transition mode if the angle between the first direction and the facing direction is between a first threshold and a second, threshold; and switching from the transition mode to the local mode if the angle between the first direction and the facing direction is smaller than the first threshold.

2. The apparatus of claim 1, wherein a ratio between the portion of the virtual scene displayed to the user and the portion of the real environment displayed to the user, in the transition mode is base on the angle between the first direction and the facing direction.

3. The apparatus of claim 1, wherein the headset is arranged to identify a common reference object, wherein the common reference object appears in both the virtual scene and the real environment at a reference direction from the user, wherein the headset is arranged to stitch the virtual scene and the real environment, as captured by the sensor arrangement, around the common reference object so as to generate a transition image; and wherein the headset is arranged to display the transition image in the transition mode.

4. The apparatus of claim 1, wherein the virtual scene comprises a virtual object at a second direction relative to the user, wherein the headset is arranged to switch from the virtual mode to the local mode if the angle between the second direction and the facing direction is larger than a third threshold.

5. The apparatus of claim 1, wherein the virtual scene comprises a virtual object at a second direction relative to the user, wherein the first threshold is based on the angle between the second direction and the facing direction.

6. The apparatus of claim 5, wherein the headset is arranged to switch from the virtual mode to the local mode if the angle between the second direction and the facing direction is larger than a third threshold angle.

7. The apparatus of claim 1, wherein the headset is arranged to determine the color characteristics of the real environment as imaged by the sensor arrangement, wherein the headset is arranged to change the virtual scene based on the color characteristics of the real environment.

8. A method comprising:

displaying a virtual scene on a headset, wherein the headset is a virtual reality and/or augmented reality capable headset;

providing corresponding virtual audio to a user in a virtual mode;

showing a real environment;

providing corresponding real audio to the user in a local mode;

displaying a portion of the virtual scene and a portion of the real environment to the user in a transition mode; and switching from the virtual mode to the local mode in response to a detection of a real person and based on the position of the real person, a facing direction, the angle between a first direction in which the real person is detected and the facing direction wherein the facing direction is the direction in which a user is facing;

wherein switching from the virtual mode to the local mode comprises:

switching from the virtual mode to the transition mode if the angle between the first direction and the facing direction is between a first threshold and a second, threshold; and switching from the transition mode to the local mode if the angle between the first direction and the facing direction is smaller than the first threshold.

9. The method of claim 8, wherein a ratio between the portion of the virtual scene displayed to the user and the portion of the real environment displayed to the user, in the transition mode is base dependent on the angle between the first direction and the facing direction.

10. The method of claim 8, further comprising:

identifying a common reference object, wherein the common reference object appears in both the virtual scene and the real environment at a reference direction from the user;

stitching the virtual scene and the real environment, as captured by a sensor arrangement, around the common reference object so as to generate a transition image; and displaying the transition image in the transition mode.

11. The method of claim 8, further comprising switching from the virtual mode to the local mode if the angle between the second direction and the facing direction is larger than a third threshold angle, wherein the virtual scene comprises a virtual object at a second direction relative to the user.

12. A non-transitory computer-readable medium storing a computer program, wherein the computer program when executed on a processor performs the method as claimed in claim 8.

13. The method of claim 8, wherein the virtual scene comprises a virtual object at a second direction relative to the user, wherein the first threshold angle is based on the angle between the second direction and the facing direction.

14. The method of claim 13, further comprising switching from the virtual mode to the local mode if the angle between the second direction and the facing direction is larger than a third threshold angle.

15. The method of claim 8, further comprising:

determining the color characteristics of the real environment as imaged by the sensor arrangement; and changing the virtual scene based on the color characteristics of the real environment.

* * * * *